July 10, 1951          F. T. ROBERTS          2,560,370

APPARATUS FOR APPLYING COVERS TO BALLS

Original Filed May 3, 1945          4 Sheets-Sheet 1

INVENTOR.
BY FRED T. ROBERTS

ATTORNEYS

July 10, 1951 F. T. ROBERTS 2,560,370
APPARATUS FOR APPLYING COVERS TO BALLS
Original Filed May 3, 1945 4 Sheets-Sheet 2

INVENTOR.
FRED T. ROBERTS
BY
Bates, Teare & McKee
ATTORNEYS

July 10, 1951     F. T. ROBERTS     2,560,370
APPARATUS FOR APPLYING COVERS TO BALLS Original Filed May 3, 1945     4 Sheets-Sheet 3

INVENTOR.
FRED T. ROBERTS
BY
Baker, Team McBean
ATTORNEYS

July 10, 1951  F. T. ROBERTS  2,560,370
APPARATUS FOR APPLYING COVERS TO BALLS
Original Filed May 3, 1945  4 Sheets-Sheet 4

INVENTOR.
FRED T. ROBERTS
BY
Bates, Teare & McBean
ATTORNEYS

Patented July 10, 1951

2,560,370

UNITED STATES PATENT OFFICE 2,560,370

APPARATUS FOR APPLYING COVERS TO BALLS

Fred Thomas Roberts, Ridgefield, Conn.

Original application May 3, 1945, Serial No. 591,787. Divided and this application June 7, 1946, Serial No. 675,053

7 Claims. (Cl. 154—16)

This application is a division of my copending application No. 591,787, filed May 3, 1945, now Patent No. 2,505,430, for a Covered Ball and Method and Apparatus for Applying the Cover.

The present application relates to the apparatus, shown in such parent application, for mechanically applying the covers to balls in an efficient manner to produce a ball in which the cover is very firmly and uniformly and accurately seated on the ball center.

Heretofore it has been the custom to apply manually two 8-shaped covers cemented to the exterior of a previously formed and inflated ball, the edges of the two cover members being manually pressed onto the ball center. Objects of my invention are to reduce the manual operations to a minimum; to cover the ball more accurately, uniformly and firmly, and at less expense.

Most tennis balls are first made as a completed rubber ball, molded and inflated to the correct size for covering, and then the covers of melton are attached by hand, the covers being first cut in the conventional figure eight pieces. These figure eight covers are usually died out of a layer of melton, to one face of which cement has been previously applied, and are then stacked together and the edges cemented while in the stack. They are then separated and attached to the surface of the ball by hand. Great skill is required to get the covers on straight and without wrinkles, and the edges are cemented together with the cement previously put on the pieces while they were stacked together.

Due to the fact that the ball, covered as above described, is then given a vulcanization to set the cement, there is a shrinkage of the melton cover, so an allowance is made for this shrinkage, the cover being cut with a fullness, and this adds to the difficulty of properly applying the covers and joining their edges.

Figure 1:
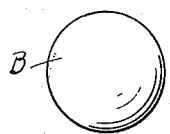
Figure 2:
Figure 3:
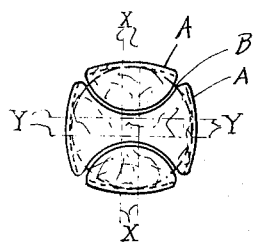
Figure 4:
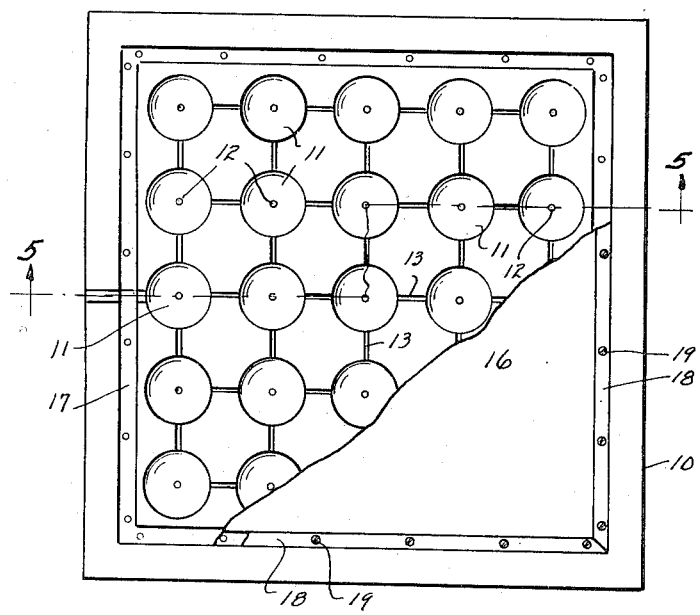
Figure 5:
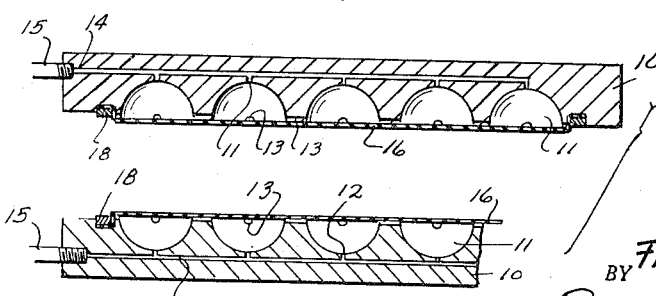
Figure 6:
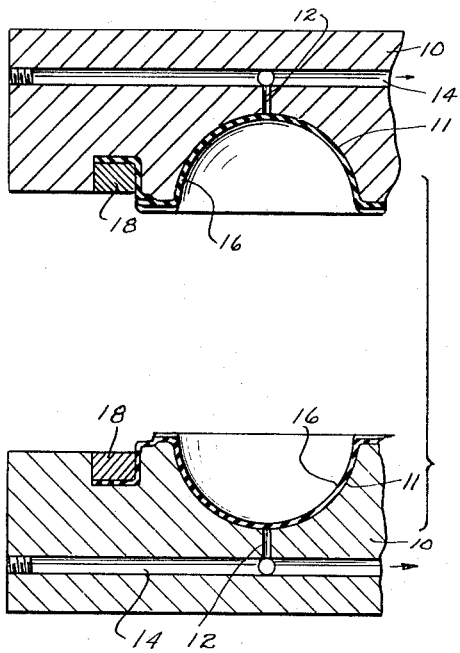
Figure 7:
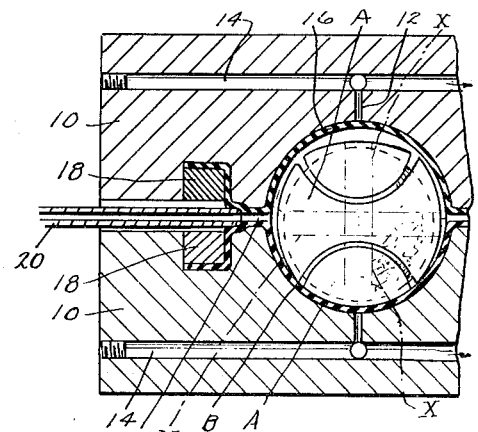
Figure 8:
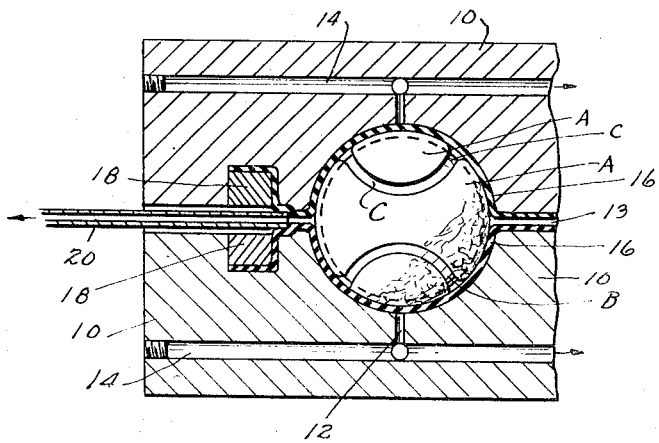
Figure 9:
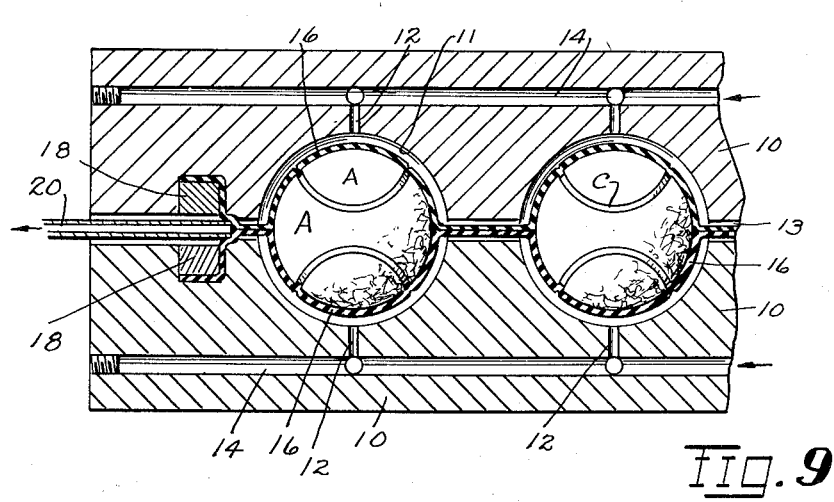
Figure 10:
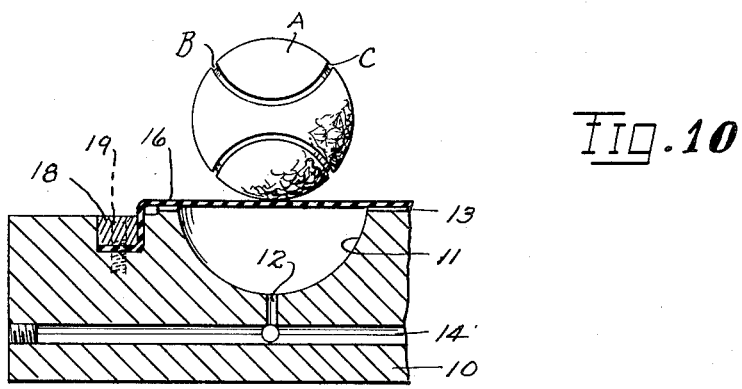
Figures 11, 12:
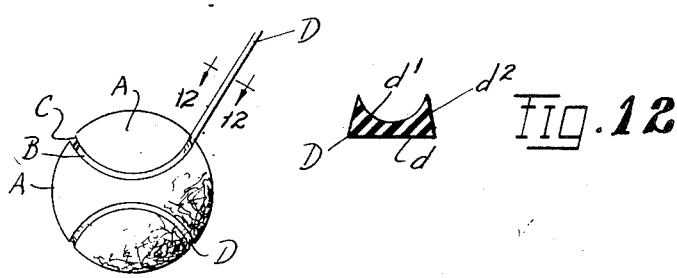
Figure 13:
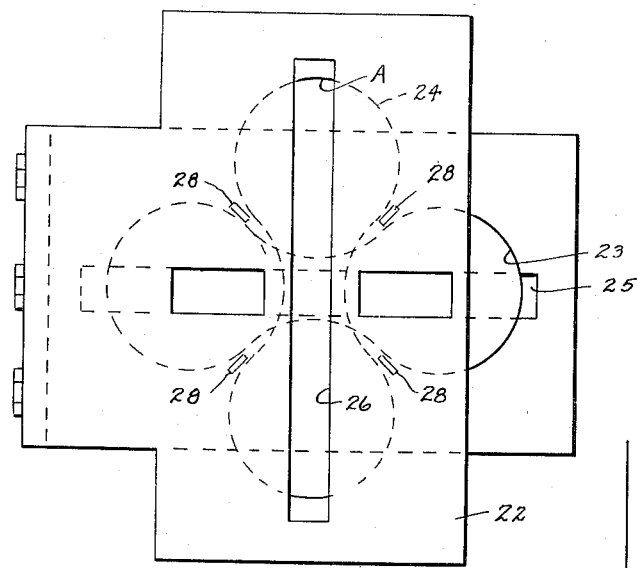
Figure 14:
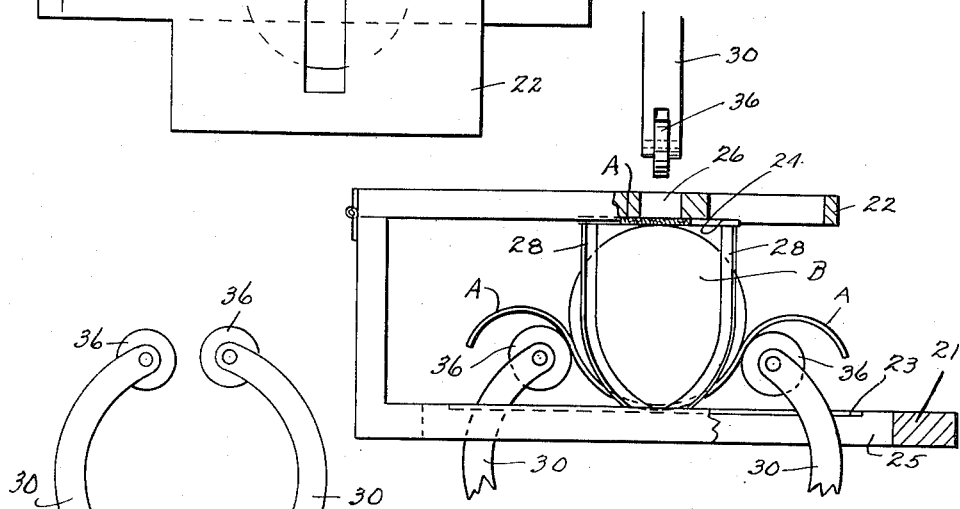
Figure 15:
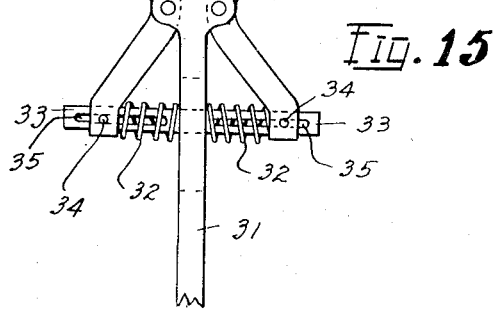

In the drawings, Fig. 1 is a view illustrating an inflated ball to be covered; Fig. 2 is a plan of one of the two sections of the cover; Fig. 3 is a view of the ball with the cover preliminarily placed thereon; Fig. 4 is a plan partly broken away of one of the molding members; Fig. 5 is a section separated and partly broken away through the two members of the cover applying mold, the plane of the section being indicated by the line 5—5 on Fig. 4; Fig. 6 is an enlarged fragmentary section of cooperating portions of the two mold members, a vacuum having been applied to draw the rubber sheathing into the mold cavities; Fig. 7 is a fragmentary section similar to Fig. 6 but illustrating the preliminarily covered ball placed in the cavity and the mold members brought together; Fig. 8 is a view similar to Fig. 7 illustrating the result after the application of a vacuum to the space between the ball and the cover, the ball having expanded gradually from its internal pressure to fill the cavity, causing the cover to be molded into place on the ball; Fig. 9 is a view similar to Fig. 8 but illustrates the application of a fluid pressure to the space between the sheaths and the mold cavities while maintaining the vacuum between the ball and the sheath, this view presses the cover onto the ball; Fig. 10 is a detail in section through one of the mold cavities showing the effect when the mold members are separated and the pressure and vacuum released; Fig. 11 is a view of the covered ball as released from the mold showing the application of a filling strip to the space between the cover sections; Fig. 12 is a cross section of the filling strip, as indicated by the line 12—12 on Fig. 11 but on a larger scale; Fig. 13 is a plan of an apparatus which may be employed in connection with preliminarily securing the covers on the ball; Fig. 14 is a sectional side elevation of such apparatus, showing the ball in place and showing also a pressure tool for forcing the covers against the ball, the tool being indicated in two successive positions; Fig. 15 is a side elevation of the pressure tool.

In preparing the cover material for use with my apparatus I apply air-curing cement to one face of a number of layers of melton. This is a cement which closes the pores of the melton on that side and becomes substantially dry in place but is able to effect a ready adherence of the cover to a ball covered with cement of a different character. Out of the cement covered layer I cut, with a die, conventional figure eight pieces as shown at A in Fig. 2. I then stack the figure eight pieces and apply air curing cement to their cut edges in the usual manner.

I take a center comprising a hollow rubber ball B, Fig. 1, which is inflated by an internal fluid pressure to the degree desired in the finished ball, for instance, 42 pounds to the square inch for a tennis ball. This inflation may be effected by closing the ball in an atmosphere of compressed air, or by closing it with suitable chemicals in the interior which react to produce a pressure, or by puncturing the completed ball with a hypodermic needle and injecting compressed fluid, all of these practices being common in the art.

I now preliminarily attach two cover members A at right angles to each other to the ball center. This preliminary attachment is along a narrow central zone indicated on the two pieces at X—X and Y—Y on Fig. 3. I have provided a simple mechanism for effecting this preliminary attachment, one form of which is indicated in Figs. 13, 14 and 15 and is hereinafter explained.

The next step in the use of my apparatus is to place the ball with the two cover members preliminarily attached, as described, in a mold which is submitted to suction to exhaust the air from the space between the exterior of the ball and the interior of the cover members and about the exterior of the cover members. Thereupon the ball with its cover expands into contact with the mold surface by reason of the internal pressure in the ball and this causes the cover to tightly adhere to the ball center forming a perfect sphere smoothly covered.

The apparatus for performing the operation just referred to is illustrated in Figs. 4 to 10 inclusive, and that embodiment will now be described.

In Figs. 4 and 5, I show a pair of suitable plates 10, each having a number of mold cavities 11, of approximately hemispherical shape, five rows of five cavities, each being indicated in these figures. Each cavity has a vent 12 at its bottom, connecting it with suitable conduits 14, which lead to a common conduit to which an exhausting hose 15 may be attached to exhaust all of the cavities.

Extending across all of the cavities in each mold member is a sheet of vulcanized rubber 16, held at its margin to the mold member. I have shown the marginal edges as being bent into a groove 17 surrounding the set of mold cavities and I place a suitable metal frame 18 in this groove, over the margins of the rubber sheet 16, and secure it by screws, one of which is shown at 19 in Fig. 10.

When the air is exhausted from the cavities of the mold through the conduit 15, the rubber sheet 16 becomes seated in each of the cavities forming a lining therefor, as indicated in Fig. 6. These members 10 with their rubber lined cavities constitute the mold in which I place the balls with the covers preliminarily attached as in Fig. 3, one of such balls being shown in Fig. 7 entrapped between the two mold members 10.

Before bringing the mold members together, I place an exhausting tube 20 in the region between them, the ends of such tube being clamped between the two rubber sheets 16 on the inner side of the annular securing members 18, as shown in Fig. 7. The cavities in each mold member are connected at the face of the mold by grooves 13 and the rubber sheet 16 sinks into these grooves thus providing a tubular connection between successive rubber lined cavities, as indicated in Fig. 8. The exhausting conduit 20 is thus in communication with each of the rubber lined cavities.

I now apply suction to the conduit 20 exhausting the air from all of the lined cavities so that the air is exhausted not only from outside the cover but from the unattached regions between the covers and ball. The exhaustion of this surrounding air in the cavities results in the internal pressure in the ball expanding it so that its cover comes snugly into engagement with the rubber wall of the cavity, as shown in Fig. 8. This forces the cover throughout its width snugly against the ball center and causes its adherence while the exterior of the cover is maintained in smooth condition by the pressure against the lining of the cavity.

The action of exhausting the air between the marginal portions of the cover and the ball results in a firmer securing of the cover to the ball than in the usual hand operation, and the expansion of the ball by its internal pressure against the rubber lined cavities causes the exterior of the cover to be perfectly spherical and have a smooth exterior.

It is to be understood that the cement employed on the inner face of the cover and the exterior of the ball is of the so-called migratory character. That is to say, the cement on the cover is of one composition and the cement on the ball of a different composition and one of them needs to receive something from the other to enable it to acquire sufficient adhering characteristics. I use on the cover a cement which in itself will not become vulcanized rubber, as it has no vulcanizing agent in it. As the covers are not always immediately used after being coated with cement and cut into figure 8-shapes, the solvent will evaporate but the rubber will not become vulcanized and will remain sticky. The cement used on the ball has an excess of vulcanizing agent mixed in it and provides the amount required to vulcanize the rubber film left on the cover when it comes in contact with it. The result is that I handle both the cover and the ball, each with their applied cements, in a satisfactory manner, but when the cover is firmly pressed on the ball, the cements unite and become vulcanized and form an effective union.

I have referred to using cement of migratory character for uniting the cover to the ball. I find it satisfactory to use on the ball a cement containing butyl (which is a very strong accelerator) and for using on the cover a cement without butyl. There is sufficient butyl in the cement on the ball so that some of it passes to the cover as the cover comes in contact with the surface of the ball. I prefer to use enough cement on the ball so that some of it squeezes out beyond the edge portion of the covers as the ball is expanded by pressure over the entire surface, and this allows the covers to shift a little in the event that the cover accidentally adheres to the ball beyond the narrow central zone.

If desired, to obtain a greater pressure in seating the cover than that furnished by the internal pressure of the ball itself, I may readily effect this by turning off the suction to the passageways 14 which have held the rubber lining in the mold and in place thereof supplying compressed air to such passageways which thereupon forces the lining positively against the exterior of the melton cover, pressing it with increased firmness against the ball.

I now open the conduit from the passages 13 so that the space between the bottoms of the cavities in the mold members 10 and rubber linings is open to the atmosphere, thus freeing the linings from the cavities. I then separate the mold members whereupon the entirely freed lining springs back by its own elasticity into its original planular condition supporting the balls above the cavities as shown in Fig. 10. This may complete the ball, or may complete it except for an eight-shaped groove C between the adjacent edges of the two cover members.

In attaching the cover to the ball there is an advantage in leaving a narrow space between the edges of the eight-shaped members, as it provides a channel adapted to receive excess of cement which is likely to accumulate on the edges of the eight-shaped pieces when they are stacked and cemented.

If no groove between the cover members is desired, I make the cover members of full size, so that their edges actually abut when they are in place on the ball, or a narrow groove may be left open between the applied covers if desired. I prefer, however, to leave a groove of substantial width as shown for instance at C in Figs. 8 to 11, and thereafter fill it by the application of a filling strip, as about to be described.

To fill the groove C, I may employ a rubber strip D cemented to both the ball center and the edges of the covers. This strip is a longitudinally straight member but in cross section, is preferably formed as shown in Fig. 12. That is to say, it has a substantially flat bottom $d$, a grooved top portion $d'$ and slightly inclined sides $d$—2. Such a member may be made by extrusion and coiled for use.

When such a strip, as shown, is placed in the groove C between the edges of the melton, the base $d$ is firmly attached to the ball, the inclined edges $d$—2 abut and slightly underhang the edges of the cover, while the groove $d'$ is on the exterior.

After this groove strip D has been placed in the groove between the cover members and pressed firmly into place, the ball is submitted to an air cure or other means of completing the vulcanization of the cement and thus the finished ball is produced. The groove $d'$ in the applied strip gives to the finished ball the desired recess between the covers, familiar to tennis players, and is useful in preserving the accuracy of the ball as it moves through the air in response to the player's stroke.

In the old practice, when the ball was vulcanized against the surface of a metal mold, the cover surface would flatten down flush with the top of the cement in the groove between the covers and then after the surface was given a fluffing treatment to restore it the space above the exposed cement became an externally facing groove between the cover edges. Players have considered that this groove was an advantage in the ball, giving it a sort of rifling, causing it to follow more accurately the intended course, but when the fluff raised in the final treatment of the ball was worn down the groove ceased to exist and its rifling effect was lost, which some players claim results in the ball "floating" during play rather than following its true course. With my system of furnishing a seam groove extending lower than the normal surface of the covers independently of any temporary fluff thereof, I maintain the rifling groove effective for a much longer period than with the old hand method of manufacture.

The applied strip D gives the depressed seam mark desired by players but in a more regular and smoother form than where such depressed seam is bounded merely by the edges of the melton covering. Another advantage of my applied seam member is that it may, if desired, be of a contrasting color to the cover and thus furnish a useful identification mark for the user or trade mark for the manufacturer.

In the usual method of applying covers by hand, the face and the edges of the covers are well covered with vulcanizable cement, so that the covers are rubberized at the edges and on one surface, and in applying such a cover to the surface of the ball in the ordinary method, there is great danger that air will be entrapped between the cover and ball and sealed therein by the adherence of the edges of the cover to the ball. This air remains in the ball and tends to loosen the cover in certain spots. By my apparatus for withdrawing of the air from between the cover and the cemented surface of the ball while attaching the cover to the surface, covers are attached uniformly throughout, thus giving a more accurate ball and one with longer life.

By avoiding pressing the cover against a metal surface to smooth it as has been the custom heretofore, I maintain the cover with its original fluffed surface and I avoid the necessity for subsequent treatment to fluff up the matted cover. It has not been practicable heretofore with a hand applied cover to employ air drying cement because it was necessary to iron out the roughly applied cover, and this was effected by using the usual vulcanizable cement and submitting the ball to this external hot ironing operation. With my method, as carried out by the apparatus of this invention, no ironing of the covers is necessary and I may thus use an air curing cement and avoid the ironing operation altogether.

Of course, if desired, one could use my operation of exhausting the air between the cover and ball and employ vulcanizable cement and submit the completed ball to vulcanizing heat, but as such operation is unnecessary in my method, for the purpose of ironing out the cover, I prefer to avoid it altogether and thus avoid the necessity for subsequent treatment to fluff up the cover. There is also a saving in the melton by my method because the covers need not be cut with a fullness to allow for shrinkage which has heretofore resulted from the heat-vulcanization of the ball.

Reference is made to my companion divisional application of parent case 591,787 filed simultaneously herewith for claims on a ball which may be produced by proper employment of my exhausting apparatus heretofore described and also for claims on the particular ball having the grooved filler at the cover edges illustrated in Figs. 11 and 12.

As heretofore explained, the two eight-shaped covers A and A are preliminarily cemented to the ball along narrow equatorial zones located at right angles to each other. The mechanism shown in Figs. 13, 14 and 15, for this purpose, is simple but effective in properly locating and securing the covers.

I will now describe the mechanism shown in Figs. 13, 14 and 15. As there shown a metal plate 21 having a figure eight cavity 23 of the correct size of the cover is fixed on a table and by an upstanding portion hingedly carries a coacting plate 22 of the same size and having a similar cavity 24 but positioned at exactly right angles to the cavity 23. Accordingly, when a cover A is placed in the cavity in plate 21 with the cemented side up and another cover A is placed in cavity 24 of plate 22, cement side down, and a ball B cemented all over its surface is accurately positioned between the two covers, the covers will touch only two opposite poles of the ball.

Suitable wheels may now be rolled upwardly against the cover A in the cavity 23 and downwardly against the cover A in the cavity 24 thus causing their central zones to adhere to the ball. Fig. 15 shows a convenient arrangement for carrying such wheels. Two bowed arms 30 are pivoted to a handle member 31 and at their lower ends pressed outwardly by compression springs 32 between the arms and the handle member. The springs are shown as surrounding a floating bar 33 extending loosely through the handle member and arms and having a pin and slot connection 34, 35 with each arm. Each of the bowed arms carries a wheel 36. The wheels are thus spring-pressed toward each other in a condition to be conveniently rolled about the ball.

By providing a slot or slots 25 in the plate 21 and a slot or slots 26 at right angles thereto in the plate 22, I provide ready means for the insertion of the arms carrying the wheels. The width of these slots may be only slightly larger than the width of the arms and thus form a convenient guide for the arms.

The ball is accurately positioned in the cavity 23 of plate 21 by the four upright bars 28. These bars also keep the edges of the cemented cover from touching the ball as the wheels press the central portion of the covers against the ball surface.

It may be noted that the mechanism just described, while effective in securing the covers along the equatorial zones as a preliminary to the vacuum and compressed air operations heretofore described, is also utilizable for preliminarily securing covers which are to be finally attached by hand pressure and smoothed down by vulcanization in the mold in the manner now in use.

Reference is made to my divisional application, Serial No. 24,222, filed April 30, 1948, now Patent No. 2,489,387, for claims relating to the apparatus illustrated in Figs. 13, 14 and 15.

I claim:

1. An apparatus having a pair of cavitary mold members adapted when in conjunction to enclose a ball with an incompletely attached cover, means for exhausting air between the ball and cover, and means for conducting pressure fluid to the cavity outside of the cover to press the cover against the exterior of the ball while such air is exhausted.

2. An apparatus for securing covers on balls comprising a pair of molds each having a substantially hemispherical cavity, means for holding an elastic air-impervious lining seated in the molds, means for exhausting air from the space between the two lined molds without perforating the linings, and means for supplying fluid under pressure to the spaces within the motor and exterior of the linings.

3. An apparatus having a pair of cavitary mold members each covered with a yielding air-impervious sheet held at its margin to the mold member in an air-tight manner, conduits communicating with the cavities and adapted to furnish suction thereto for exhausting the cavities to seat the sheets therein, a conduit adapted to be clamped between the two mold members, means for supplying suction to said conduit to exhaust air about a ball seated in the cavities, and means for releasing the first mentioned suction and supplying compressed air through the same passageways to the cavities while the second mentioned suction is maintained.

4. An apparatus for securing covers on balls comprising a pair of molds each having a substantially hemispherical cavity, means for reducing the air pressure in the cavities to hold elastic air-impervious linings seated in the cavities, means for exhausting air from the space between the two lined molds, so that a ball with a cover not fully attached thereto and placed within the lined cavities will have the air withdrawn from between the cover and ball, and means for pressing the linings inwardly to press the cover onto the ball while such exhaustion of air between them is maintained.

5. An apparatus having a pair of cavitary mold members each having a yielding air-impervious lining forming part of the apparatus and the two linings adapted to enclose a ball embraced by a cover, and means for supplying compressed fluid to the space between the cavities and linings to press the latter against the exterior of the cover for the ball.

6. An apparatus having a pair of cavitary mold members each covered with a yielding air-impervious sheet forming a part of the apparatus and held in an air-tight manner at its margins, means for exhausting air from the cavities to seat the sheets therein, whereby lined cavities are produced adapted to receive balls, and means for supplying compressed fluid to space between the cavities and sheets to press the sheets against the exterior of the balls.

7. An apparatus comprising a pair of cavitary molds, a pair of air-impervious yielding sheets forming a part of the apparatus and held in an air-tight manner at its margins about the exterior of the cavities, means for exhausting air from the cavities to cause said sheets to be seated in the cavities and held in place therein to enable a ball to be placed in the cavities and the molds closed and means for exhausting air from the space between the linings and the ball when the mold is closed, and means for supplying fluid under pressure to the exterior of the linings to force them against the ball.

FRED THOMAS ROBERTS.

REFERENCES CITED

The following references are of record in the file of this patent:

UNITED STATES PATENTS

| Number | Name | Date |
|---|---|---|
| 1,387,805 | Roberts | Aug. 16, 1921 |
| 2,224,363 | Voit et al. | Dec. 10, 1940 |
| 2,272,090 | Larabee | Feb. 3, 1942 |
| 2,306,059 | Humphrey | Dec. 22, 1942 |
| 2,309,865 | Reach | Feb. 2, 1943 |